United States Patent
Brooks (10) Patent No.: US 9,594,563 B2
(45) Date of Patent: Mar. 14, 2017

(54) CPU ARCHTECTURE WITH HIGHLY FLEXIBLE ALLOCATION OF EXECUTION RESOURCES TO THREADS

(71) Applicant: Robert J Brooks, Fort Collins, CO (US)

(72) Inventor: Robert J Brooks, Fort Collins, CO (US)

( * ) Notice: Subject to any disclaimer, the term of this patent is extended or adjusted under 35 U.S.C. 154(b) by 518 days.

(21) Appl. No.: 14/144,958

(22) Filed: Dec. 31, 2013

(65) Prior Publication Data
US 2015/0186148 A1 Jul. 2, 2015

(51) Int. Cl.
G06F 9/00 (2006.01)
G06F 9/32 (2006.01)
G06F 9/38 (2006.01)
G06F 9/48 (2006.01)
G06F 15/80 (2006.01)

(52) U.S. Cl.
CPC ............ *G06F 9/321* (2013.01); *G06F 9/3834* (2013.01); *G06F 9/3851* (2013.01); *G06F 9/3857* (2013.01); *G06F 9/48* (2013.01); *G06F 15/8023* (2013.01)

(58) Field of Classification Search
CPC ............................ G06F 15/8023; G06F 9/3851
See application file for complete search history.

(56) References Cited

U.S. PATENT DOCUMENTS

| | | | | |
|---|---|---|---|---|
| 2003/0206527 A1* | 11/2003 | Yim | ...................... | H04L 12/437 370/238 |
| 2008/0028183 A1* | 1/2008 | Hwu | ...................... | G06F 9/3836 712/20 |
| 2012/0137077 A1* | 5/2012 | Shah | ...................... | G06F 9/3802 711/125 |

* cited by examiner

*Primary Examiner* — Zachary K Huson
(74) *Attorney, Agent, or Firm* — MU Patents (57) ABSTRACT

A CPU architecture is proposed which flexibly allocates chip resources among threads. Execution units (microcores) are arranged in a ring. Instruction fetch units (front-ends) deposit instructions sequentially into storage elements within the microcores. Multiple front-ends can each feed segments of the ring; each such segment is a "smart queue". If, due to a sustained higher execution rate, a thread catches up to the next thread ahead of it, the slower thread steps aside and lets the faster thread play through. Other circumstances may lead to a thread consuming more than its usual share of resources, possibly even all of the microcores, for a time. The architecture has no instruction set dependencies; it is applicable to existing instruction set architectures and will speed up execution of them significantly as compared to conventional architectures.

20 Claims, 6 Drawing Sheets

CPU ARCHTECTURE WITH HIGHLY FLEXIBLE ALLOCATION OF EXECUTION RESOURCES TO THREADS

CROSS-REFERENCE TO RELATED APPLICATIONS

This nonprovisional utility patent application claims the benefit of provisional application 61/748,115, entitled "Smart Queues: A CPU Architecture for the Nanoscale", filed Jan. 1, 2013.

BACKGROUND

Due to diminishing returns of increasing cache sizes, and perceived limits to the amount of exploitable instruction-level parallelism (ILP), the focus of CPU architecture has shifted in recent years from increasing performance by increasing instructions per cycle (IPC) to parallelism via multiple cores and threads per CPU chip (chip multiprocessing, CMP). While server applications generally make good use of CMP, even they may be challenged to continue to do so as core counts escalate well into the double digits. In the personal and mobile spaces, the situation is much worse, with the majority of applications making minimal use, if any, of more than one thread or core.

What is proposed is essentially a refactoring of the resources of a multi-core CPU into something that is more easily utilized by real software. Rather than a set of cores with hard boundaries between them, those boundaries are removed to allow the execution units to be shared between threads. Rather than one or a few front-ends feeding a complex back-end, per core, a set of front-ends per chip feeds a set of simple back-ends (microcores) in a flexible manner. The benefits of this arrangement are: 1. Increased exploitation of ILP due to the potential of many microcores executing on the same cycle 2. Elimination of some write-after-write dependency (WAW) stalls 3. Facilitation of the execution of multiple serially dependent low-latency operations per cycle 4. Reduced memory stalls due to a large number of bypass paths inherently provided 5. Provision for speculation along multiple branch paths 6. A very high degree of parallelism from single-threaded code in certain special, but not uncommon, cases, by recognizing and exploiting loop-level parallelism.

DETAILED DESCRIPTION

It should be noted that the particular quantities of resources shown in the drawings are merely examples, and a person skilled in the art will realize that an embodiment or implementation may vary resource quantities as needed to achieve desired design goals or to meet constraints.

Figure 1:
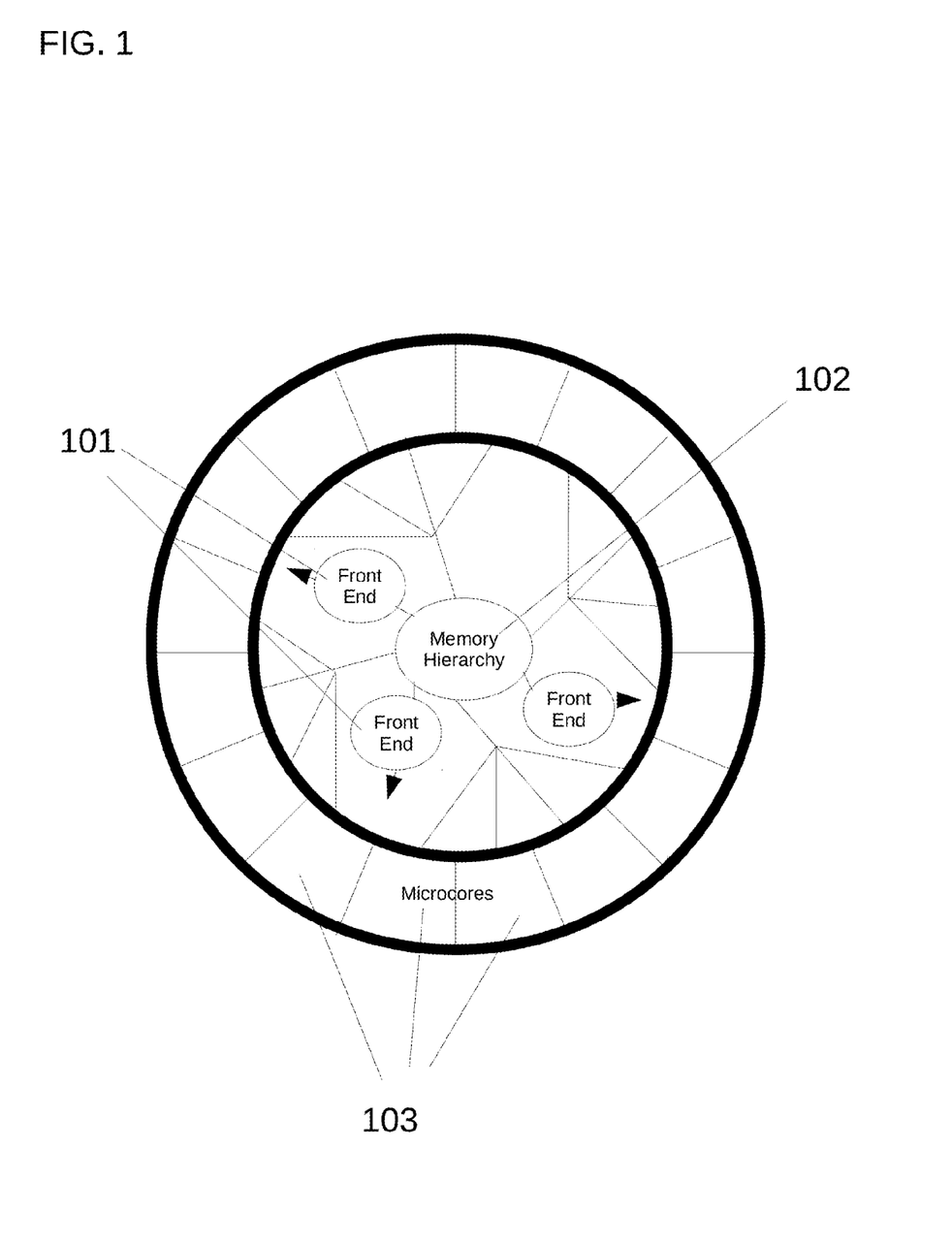
FIG. 1 is a conceptual overview.

Referring to FIG. 1 (100), a quantity of microcores 103 are arranged in a series, typically closed so as to form a ring. Some number of front-ends 101 feed instructions to microcores over some fabric, such as a set of global instruction buses. A memory hierarchy 102 is also connected to the microcores over some fabric. "Memory hierarchy" is meant in its most general sense, and may include any number of various types and levels of caches, main memory (which may be non-uniform, that is, of various localities), and input-output devices. A person skilled in the art will recognize that there are many alternatives and tradeoffs in implementing a memory hierarchy and its interconnecting fabric and interfaces.

Front-ends are essentially identical to those in conventional CPUs. They are responsible for fetching instructions from the memory hierarchy, performing any instruction pre-processing or conversion (such as using a microcode engine to convert macroinstructions to microinstructions), branch prediction, and instruction dispersal.

Instruction dispersal consists of placing some number of instructions from the predicted instruction stream onto a set of parallel global buses to be captured by a sequential set of microcores. The front-end provides a microcore ID number and an instruction pointer; microcores compute an instruction pointer, as well, so that they know which instructions to accept and be able to detect mispredicted branches. A thread ID is also provided. Microcores may fill up with stored instructions, in which case flow-control backpressure is asserted. Branch mispredictions are communicated back to the front-end so it can restart the correct instruction stream.

A special instruction may be used to initialize instruction pointers and other initial state in microcores for creation of new threads or forks or other management purposes.

Microcores may all be identical in capabilities, or there may be some degree of specialization. For example, since floating-point (FP) units tend to be large and power-hungry, only one of every few microcores in the ring might be FP-capable.

If there is more than one type of microcore, the front-end must tag and place instructions appropriately such that microcores are always given instructions they are capable of executing.

A microcore only executes a single instruction at a time. The result is placed on an output bus that feeds the next several microcores downstream. The result is tagged with the name of the resource it represents, for example, a register name, or a memory address. Condition codes, predicates, or the like are transmitted along with the result. A valid/invalid indication and a "resolved" indication is also provided. In the case of registers, the tag includes a thread ID.

All microcores with valid inputs and a current decoded instruction execute at the same time. It is possible that a microcore sees multiple upstream matching resource tags. In that case, it chooses the nearest one (even if invalid, which means the needed input is not ready yet, and implies a stall).

Figure 2:
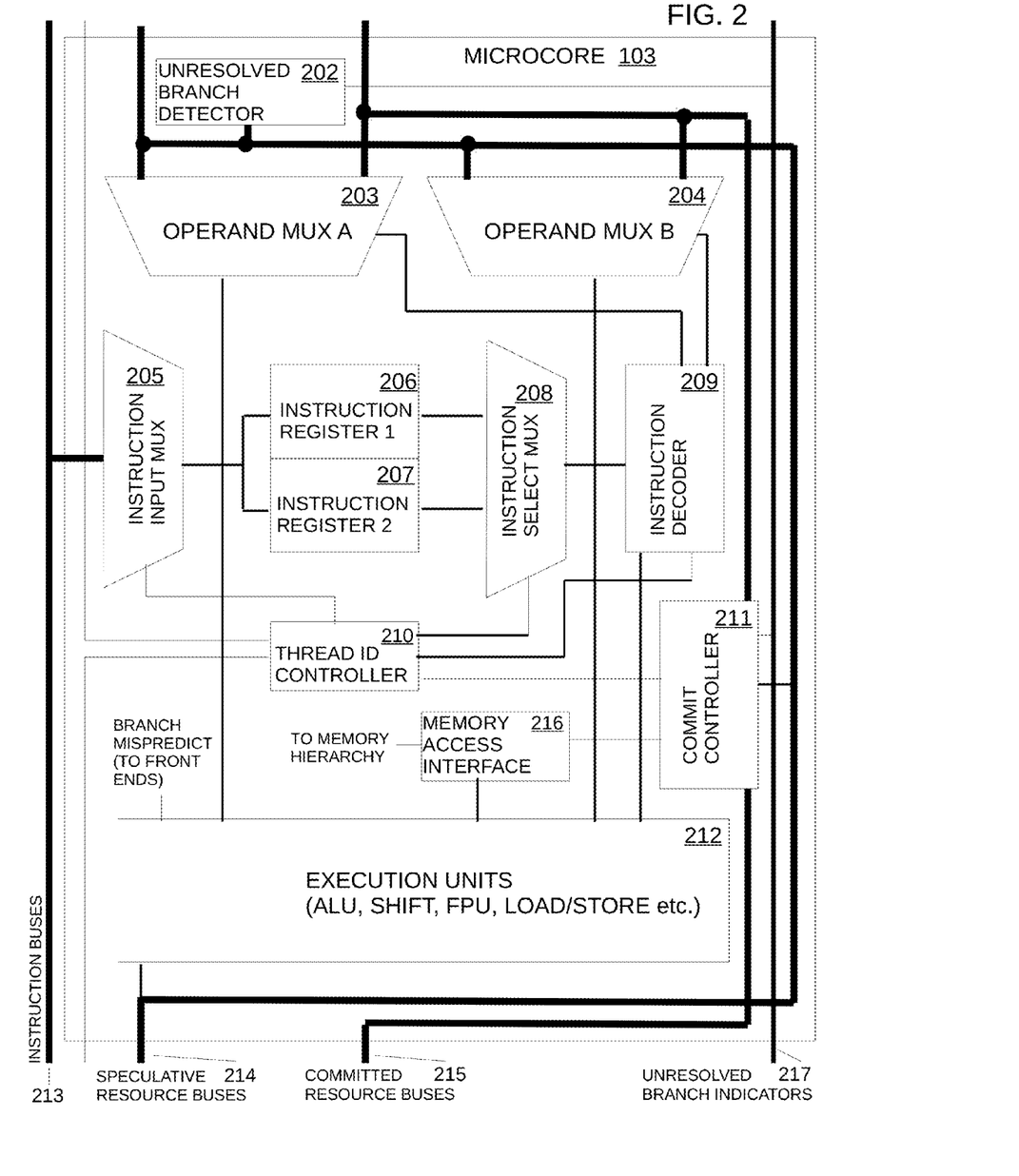
FIG. 2 is block diagram of a microcore.

Referring to FIG. 2, a MICROCORE 103, as drawn such, tiles vertically with its neighbors. Note INSTRUCTION BUSES 213 which are the set of global instruction buses driven by the front-ends. While as shown these have a continuous connection among all the microcores, a person skilled in the art will know that depending on the particulars of a design, repeaters, whether registered (clocked), or passive buffers may be required, and similarly so for other buses. If an instruction is tagged with an instruction pointer which matches one stored in THREAD ID CONTROLLER 210, it is selected via INSTRUCTION INPUT MUX 205 and stored in one of the instruction registers (206, 207).

The THREAD ID CONTROLLER 210 determines which instruction register is loaded, and also which is sent to INSTRUCTION DECODER 209 by driving the select on INSTRUCTION SELECT MUX 208. The decoder drives an opcode to EXECUTION UNITS 212 and operand selects to OPERAND MUX A 203 and B 204.

The operand muxes each connect to all the resource buses. The SPECULATIVE RESOURCE BUSES 214 are driven by microcores that are immediately upstream. That is, one speculative resource bus is driven by the microcore just above the drawn microcore, a second such bus is driven by the second microcore up, and so on. The number of speculative resource buses connected to any one microcore would typically be relatively small, perhaps 20. It is a compromise between how much instruction-level parallelism is desired, versus cycle time, since the more microcores a speculative resource bus goes through, the slower it will be.

The operand muxes, and similarly, the instruction input muxes, are not simple muxes which select based on a binary select code, but rather select associatively, based on matching the select code with the tag that accompanies incoming data or instructions.

All of the speculative resource buses that enter at the top pass through the microcore and exit at the bottom, except one. That is the one which originated the farthest upstream. It goes into the COMMIT CONTROLLER 211 and is driven onto a COMMITTED RESOURCE BUS 215, either immediately, or on a later cycle after dependencies have settled. In place of the speculative resource bus which terminates in this microcore, one is driven by the output of the execution units, instead.

The number of committed resource buses is typically relatively large, being the number of per-thread resources (register set size) times the number of threads, plus the number of global resources (such as the results of memory loads and/or stores). It is functionally optional, though a performance benefit, whether the result of a load is placed onto a committed resource bus, and they can be overwritten at any time. Stores, however, must be placed onto a committed resource bus, and can only be removed upon transmission to the memory hierarchy. If a store needs to be committed and there is no bus available, a stall will occur.

The committed resource buses used for loads and stores have both a thread ID tag and an address tag. The thread ID tag is used to maintain memory coherence in the following manner: The thread ID tag may match a particular thread, or have a value of "shared". When a load or store first causes the allocation of a committed resource bus, the thread ID tag is set to the ID of that requesting thread. A subsequent load from a different thread, to that same address, changes the thread ID tag to "shared", and is satisfied. If there are no intervening stores, any number of loads to that address from any thread will match and the loads will be immediately satisfied from that committed resource bus.

A store that matches the thread ID and address tags can place its data on the bus and complete immediately. Matching the address but a thread ID of "shared" sets the thread ID to that of the requester. No match at all cause the allocation of a new committed resource bus with the thread ID of the requester. In either case, the memory hierarchy ensures unique permission system-wide to write that address, and only after that occurs does the store data get placed on the bus and the thread allowed to continue to execute.

The foregoing description of a memory coherence protocol is intended as an example. A person skilled in the art will recognize the similarity to established cache coherence protocols, and that variations with various tradeoffs are possible.

The design of the committed resource buses is such that if the same one is driven concurrently by more that one microcore, the value driven is the one driven by the most downstream microcore in a local set.

The commit controller does not drive the committed resource bus, that is, overwrite a previously written value on it, unless the speculative resource bus that the value comes from is indicated to be valid, has not been superceded by any later results of the same resource tag, and the most upstream member of the set of UNRESOLVED BRANCH INDICATORS 217 indicates that there are not any mispredicted or not yet known branches affecting the resource to be committed.

The most upstream member of the set of unresolved branch indicators terminates at the commit controller, and is replaced in the set of unresolved branch indicators being sent downstream by a new signal from UNRESOLVED BRANCH DETECTOR 202.

In order to determine if a branch misprediction occurred, microcores must be able to compute the value of the instruction pointer. This computed value is compared to that provided by a front-end; if they do not agree, there is a branch misprediction. At any particular microcore, one or more of the speculative resource buses may be tagged with "instruction pointer", which branch instructions produce as a result. If this is so, the current instruction pointer is computed as the incoming instruction pointer (the nearest in the case of multiple) plus the number of intervening microcores.

If there is no instruction pointer on a speculative resource bus, the current instruction pointer is computed by adding the instruction pointer on the committed resource bus to the quantity of speculative resource buses that exist as inputs to each microcore (this represents the distance between the current microcore and the closest upstream one whose instruction pointer had become committed).

If a terminating speculative resource bus contains an instruction pointer, that value is copied to a committed resource bus, as normal. If some other resource is terminating, the committed resource bus that contains the instruction pointer for that thread is incremented.

Loads and stores are performed via the MEMORY ACCESS INTERFACE 216. Stores would not be sent to the memory hierarchy until they are committed; the commit controller performs this function.

Returning to THREAD ID CONTROLLER 210, it was described how it controls the path from the INSTRUCTION BUSES 213 to INSTRUCTION DECODER 209; now some particulars of how it does so are further described. The thread ID controller typically stores one thread ID value, a current thread ID. It also may, at times, store a standby thread ID. The controller receives a thread ID from its upstream neighbor and drives one to the downstream neighbor. The current thread ID normally matches the incoming thread ID, or the incoming thread ID indicates an idle condition. The current thread ID may also be initialized via the execution of a special instruction.

When a valid incoming thread ID does not match the current thread ID, it means that a faster executing thread has caught up with a slower executing thread. It is not desirable to throttle all threads to the pace of the slowest, so the slower thread suspends and lets the faster one pass through. This is done by copying the current thread ID to the standby thread ID, and the incoming thread ID into the current thread ID.

When there is a valid standby thread ID stored, and the incoming thread ID indicates idle, this means the fast thread has passed through, and the standby thread ID becomes the current thread ID once again.

Figure 3:
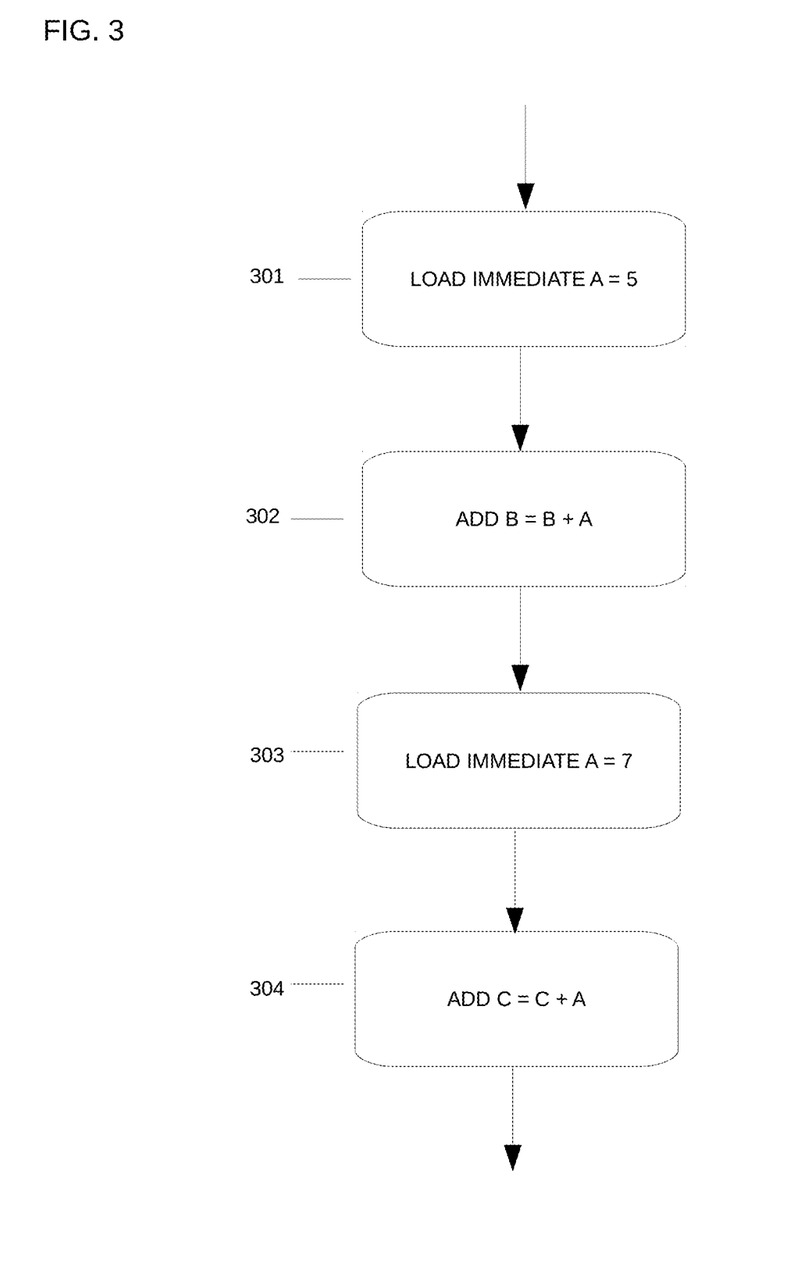
FIG. 3 shows an instruction sequence that is sped up by eliminating certain read-after-write and write-after-write dependencies.

FIG. 3 shows an instruction sequence that, on a conventional CPU, could take up to four cycles to execute because of read-after-write, write-after-read, and write-after-write dependencies. Two features of the invention facilitate the execution of the sequence in only one cycle. First, there is a read-after-write dependency between instruction 301 and 302, and similarly between instructions 303 and 304. There is an apparent write-after-write dependency between instructions 301 and 303, and an apparent write-after-read dependency between instructions 302 and 303. If literal trips to and from a register file were occurring for each of these instructions, it would take even longer than four cycles. An advanced conventional CPU would optimize out some of this via bypass paths, but certainly not down to a single cycle. The write-after-write and write-after-read dependencies do not occur in this invention, because the writes are performed on two different microcores with results driven on two different output buses. Each result is consumed by an immediately following microcore. Even though the resource name is the same in both cases, the two different versions of it lead to a correct outcome in only a single cycle. This can be looked at as a temporal to spatial transform.

The read-after-write dependencies also do not lead to stalls because of the way the invention supports multiple low-latency operations per cycle due to its dataflow orientation. Even though the add is a higher latency operation, the load-immediate is essentially a zero-latency operation and so it should be no problem to let if flow through and be performed in the same cycle as the add.

Figure 4:
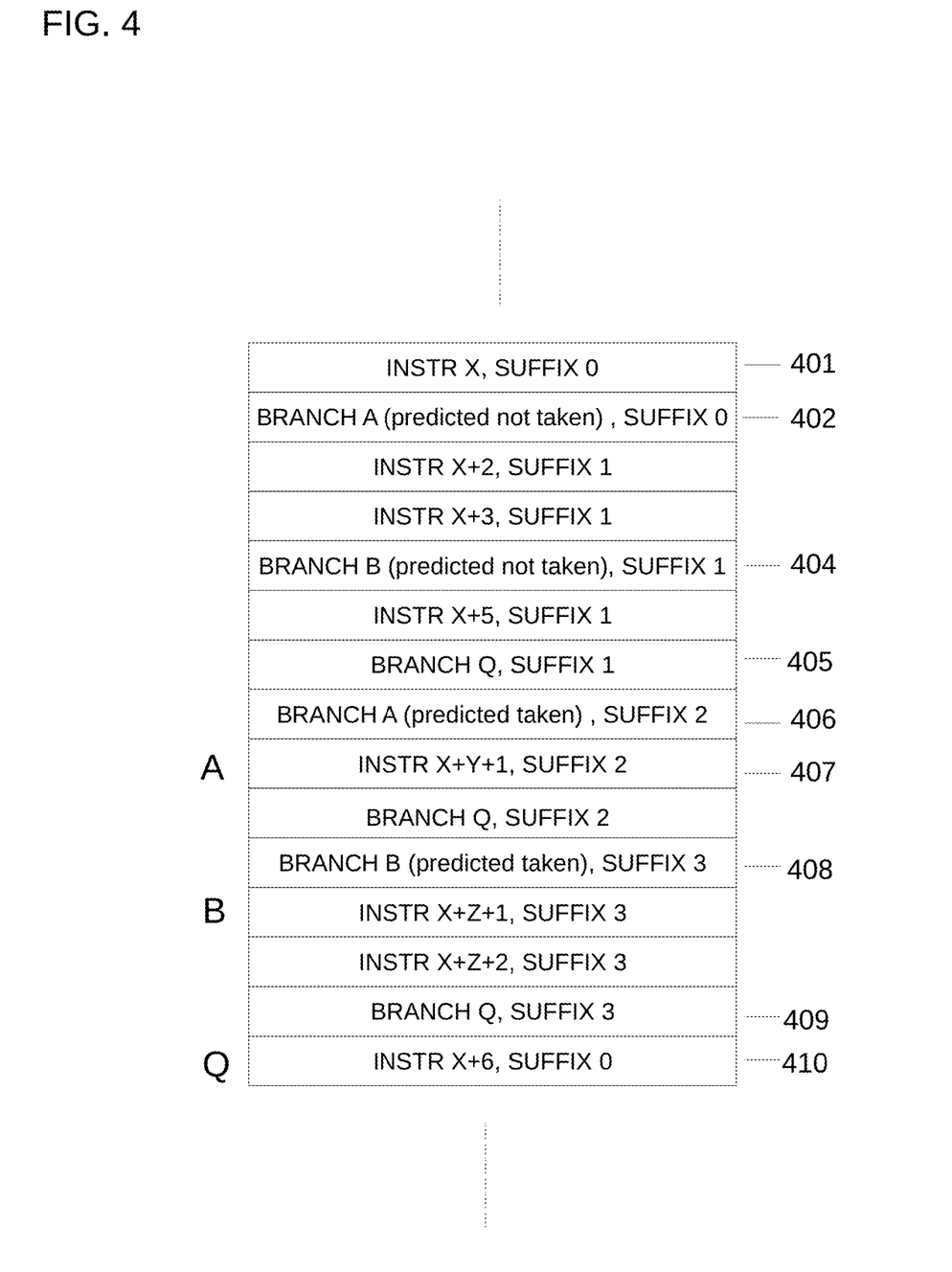
FIG. 4 shows a sequence of microcores containing multiple alternative branch paths.

Speculation down multiple branch paths is supported; a thread ID suffix is used to enable this. When only a single path is being executed, the suffix is zero. After forking, until single-stream execution resumes, no new suffix-zero results are produced; all paths have a non-zero suffix. When the correct fork has been determined, its committed results are renamed with suffix zero. All paths after forking can consume the committed results tagged with suffix zero, but not those tagged with any of the peer paths' suffixes.

One path may be a linear continuation from the fork point in the sequence of microcores; this path has an advantage in that it may consume pre-fork speculative resources. Other forks are permitted to consume only committed resources, and, of course, their own speculative resources. In order to avoid consuming a stale resource, the first microcore of a fork must wait until the committed instruction pointer of the parent thread matches its own IP as established by a special instruction from the front end.

In further explanation, see FIG. 4, a series of microcores labeled with the instructions they contain and their thread ID suffixes. Microcore 401 is the last instruction of the single stream, has an address (instruction pointer) of X, and suffix 0. Microcore 402 has a conditional branch instruction, which is the first fork. The not-taken version is in 402, with the taken version in 406. The branch target, A, is in 407. The linear continuation, suffix 1, follows Branch A at 402. At 404 and 408 are the two versions of Branch B, a third fork. All of the forks terminate with a Branch Q, as at 405. At 409 is a Branch Q even though the following microcore 410 contains the instruction with address Q. This branch is necessary because the instruction address stream of the third fork does not flow contiguously into Q, it is rather at X+Z. It is rather the first fork (the linear continuation) that flows into Q. But, there is a Branch Q there, as well (at 405), which is not in the original program but inserted by the front-end. All three Branch Q's have a special function such that whichever one sees no mispredicts upstream restores the current thread ID to suffix 0 and relabels its committed resources from the temporary suffix back to 0.

A large number of microcores, up to and including the total number implemented in a chip or similar unit, can enter a special mode in which they all work together on the same thread. This is accomplished by executing iterations of a loop in parallel. See FIG. 5 (500) for an illustration of the assignment of operations and iterations to microcores.

Figure 5:
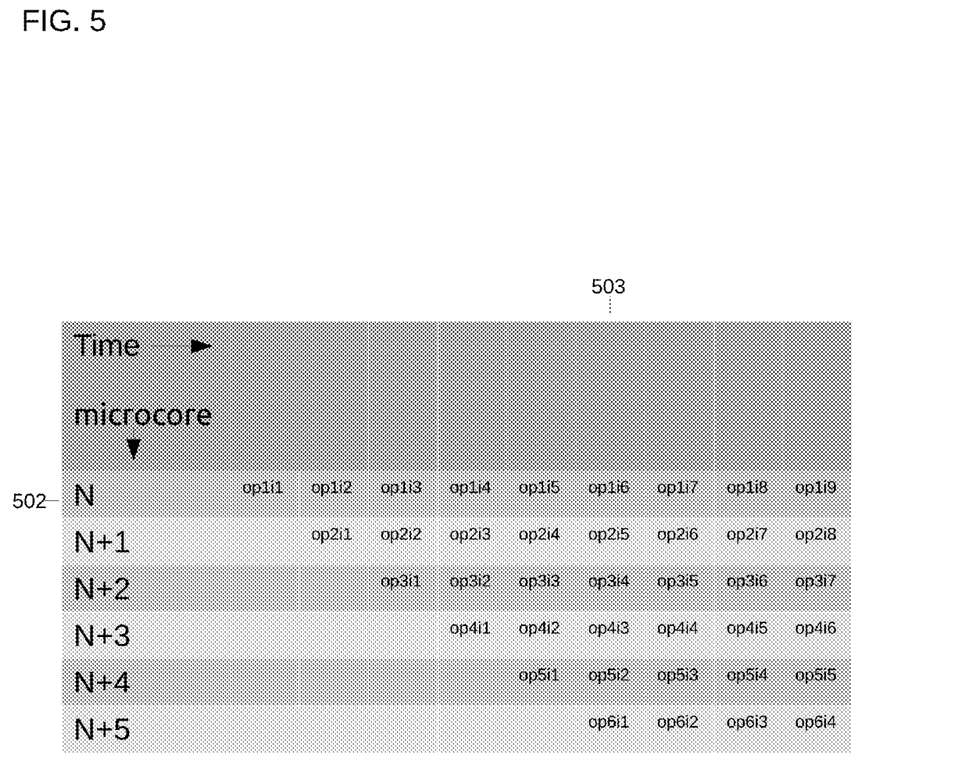
FIG. 5 shows the arrangement of multiple microcores executing different iterations of a loop concurrently.

Regarding the notation "opnim", an example of which is seen at the intersection of row 502 and column 503 as "op1i6", the number after "op" refers to the sequential instruction within an iteration, while the number after "i" refers to the iteration number. Thus, in the case of the "op1i6" example, the first microcore N is executing the first instruction (op1) of the 6th iteration, at timestep 6.

Note that execution of a single iteration proceeds diagonally through the table from upper left to lower right. If we assume that all of the instructions in the loop body are shown (6), and all the iterations are shown (9, though the later ops of the later iterations are cut off), the entire loop is finished executing at timestep 14. This compares to 54 timesteps in the simple non-parallel case, with the advantage going up greatly as either iterations or instructions per iteration increase.

A problem can arise when an instruction in an iteration uses a result produced in a previous iteration. The software assumption is that a first iteration of a loop is complete before the second one starts, so this is likely a common occurrence. Suppose a loop variable "j" is incremented by op6. This happens, for iteration 1, at timestep 6, so if op1 of iteration 2 is referencing "j" assuming that it was already incremented, that is an error. However, if instead it is op1 that it incrementing "j", then op1; of each iteration properly sees and the increment performed by the previous iteration, and any read-only reference to "j" by any later operation is correct, as well. Thus, the requirement is that the production of a value for consumption in a later iteration must occur no later, as a matter of position in the instruction stream, than the consumption.

One possible solution involves loop unrolling: often, inner loops are short, and many copies of them can fit within an implemented set of microcores. If such dependencies only exist in the unrolled inner loop, but not in the first upper level that has not been unrolled, then the scheme functions properly.

Another solution is for a compiler or dynamic optimizer to transform the code so that updates to loop variables and pointers are done at the beginning.

Another issue is the usual assumption of a result being produced and being held statically for a time until other microcores have a chance to consume it is violated in parallel-loop mode. This could be solved by latching results at the output of a microcore and pipelining them along in the manner of a systolic-array, but that would harm the performance of the speculative result buses in normal mode. A better solution is for a consuming microcore to grab needed results in the cycle they appear and store them in an array until needed.

Since parallel-loop mode can use a large portion, perhaps all, of the microcores, a fairness manager suspends parallel-loop execution periodically so that other threads receive sufficient execution time. Such throttling may be required for power management purposes, as well.

Figure 6:
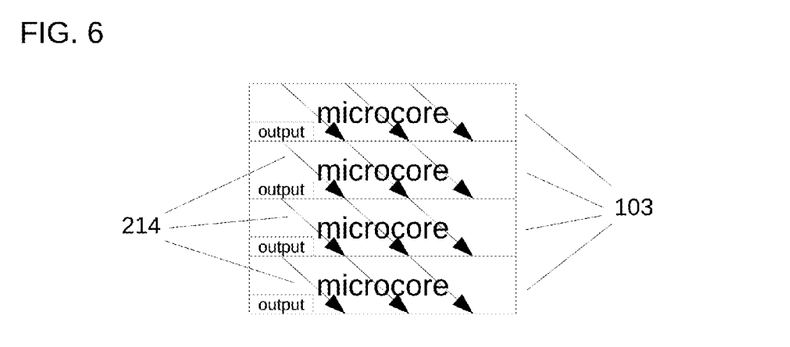
FIG. 6 shows the diagonal shifting of result buses used to facilitate tiling.

For performance and design productivity reasons, microcores are best designed to be able to tile together. One enabler for this is for the speculative resource buses 214 and unresolved branch detect signals to effectively proceed diagonally through the microcore 103, as in FIG. 6. One skilled in the art will appreciate that this does not mean that those conductors literally are diagonal within the microcore; conventional Manhattan routing geometry is fine; the requirement is simply that the port positions need to shift one position on the exit side relative to the entry side.

Figure 7:
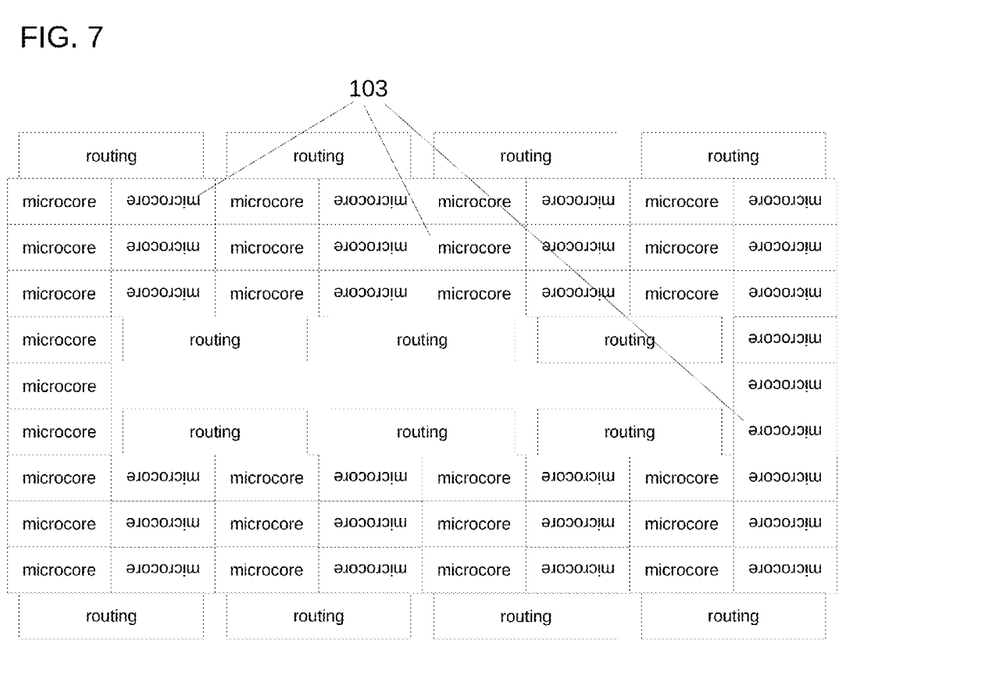
FIG. 7 shows an arrangement of tiled microcores.

Another challenge is how to efficiently form a ring within the constraints of nanoscale semiconductor processes, One such requirement is typically that all transistors have the same orientation, that is, that their gates are parallel. FIG. 7 shows an arrangement that forms a ring by mirroring microcores 103 and placing replicated routing blocks at the ends of columns.

I claim:

1. A computing system comprising:
    a plurality of front-ends which may fetch, branch-predict, pre-decode, and disperse program instructions; and
    a plurality of microcores which are configured to accept instructions from any of the front-ends, execute them, and produce one or more result values transmitted on one or more output buses for consumption by downstream microcores, feedback to the front-ends, communication with a memory hierarchy, and system control and management operations, wherein said result values are tagged with a resource name.

2. The system of claim 1, wherein the microcores are logically arranged in a ring, with the output, or set of outputs, of a given microcore connected to a plurality of downstream microcores.

3. The system of claim 2, wherein sets of microcores are physically laid down in stripes, stripes being parallel to the flow of results, stripes being full length at array edges, approximately half length in the interior and paired end-to-end, routing blocks present at the ends of stripes connecting adjacent pairs of stripes, microcores within alternate stripes mirrored around an axis normal to result flow, enabling the formation of a ring by tiling microcores that are identical in design and orientation except for mirroring, and the provision of routing blocks which are themselves of a common design which may be tiled.

4. The system of claim 1, wherein a faster executing thread may overtake a slower executing thread, by a set of microcores which had been executing the slower thread suspending its execution of said thread, then executing the fast thread instead, then resuming execution of the slow thread.

5. The system of claim 1, wherein some microcores are specialized for performing a subset of the total architectural instruction set, other microcores are specialized for a different subset of the instruction set, and/or other microcores are capable of executing the entire instruction set, and front-ends only send types of instructions to microcores that are capable of executing said instructions.

6. The system of claim 1, wherein, due to the fact that different temporal versions of the resource name register) can appear simultaneously on the outputs of different microcores, write-after-write stalls involving a said resource are avoided.

7. The system of claim 1, wherein a series of microcores may execute instructions, whether from the same thread or from different threads, simultaneously, due to their inputs all being valid and available at the start of a cycle, that is, having no dependencies.

8. The system of claim 1, wherein a series of microcores may execute instructions belonging to a common thread simultaneously, due to a first input being available at the start of a cycle, and subsequent inputs being developed within a cycle, the sum of the latencies of all such operations being less than or equal to one cycle.

9. The system of claim 1, wherein a front-end populates multiple series of microcores with different sequences of branch predictions and intervening instructions, with the results of the ultimately confirmed path becoming committed, and the remainder being discarded.

10. The system of claim 1, wherein a set of microcores enter a parallel loop mode, each microcore dedicated to executing a particular instruction within the loop, said microcore executing successive iterations on successive cycles, successive microcores executing successive instructions, the beginning of execution of each successive microcore being shifted in time one cycle later relative to the microcore immediately upstream.

11. The system of claim 10, wherein a microcore that is the consumer of a result from an upstream microcore latches the result and stores it until it is needed.

12. The system of claim 10, wherein a global fairness manager may suspend execution of a set of microcores in parallel loop mode, allow said microcores to resume normal execution of threads for a time, continuing to so switch back and forth between modes as necessary to allow fair forward progress of all threads.

13. The system of claim 1, wherein the output of a microcore is provided on a local, speculative, resource bus to nearby downstream microcores, and such a result may either be superceded by a subsequent result, or become committed and transmitted on a global committed resource bus.

14. The system of claim 13, wherein local resource buses are shifted one position as they pass through each microcore, thus terminating after as many microcores as there are positions implemented, said diagonal scheme enabling independence of the design of the length of local resource buses, and the size and aspect of the total set of microcores, while retaining the ability to create an array by tiling microcores.

15. The system of claim 13, wherein the said results on a subset of the chip-wide set of committed resource buses are the results of memory operations, such as loads or stores, and the collective set of such results, being available to any microcore with low latency, and high bandwidth provided by the large parallel set of committed resource buses, provide the equivalent of a very high performance cache.

16. The system of claim 15, wherein the results of memory operations are available to all threads, providing a very low latency inter-thread communication ability.

17. The system of claim 1, wherein at least one microcore has an execution path comprised of combinational logic which takes at most one cycle to execute, provided any dependencies have been satisfied.

18. The system of claim 1 wherein at least one microcore has an instruction input mux, thread ID controller, and pair of instruction registers, one of which stores a current thread instruction and the other of which stores a standby thread instruction.

19. The system of claim 18 further comprising an instruction select mux configured to feed the correct thread's instruction to an instruction decoder, with the thread ID controller managing the switching between current and standby threads.

20. A method of operating a processor, comprising the steps of:

a) one of several front-ends dispersing a tagged series of instructions to a contiguous set of microcores, while simultaneously other front-ends may disperse other differently tagged instruction sequences to other contiguous sets of microcores;
b) said microcores storing said instructions upon matching the tag via the thread ID controller;
c) the thread ID controller determines which instruction is sent to an instruction decoder;
d) the decoder driving an opcode to one or more execution units and selecting an operand MUX;
e) the operand MUX connected to one or more resource buses providing operands to the execution units, the result being transmitted on a speculative resource bus;
f) an unresolved branch detector and commit controller, together with the thread ID controller transferring a value from a speculative resource bus onto committed resource bus once dependencies have cleared;
g) memory access operations sent to the memory hierarchy via the memory access interface;
h) the thread ID controller, instruction decoder, and commit controller using a parallel loop mode where distinct sets of microcores each work on a different iteration of a loop concurrently; and
i) the front-ends populating distinct sets of microcores with different execution paths to be executed concurrently, with only the correct execution path to be ultimately committed.

* * * * *